(12) United States Patent
Roth et al.

(10) Patent No.: US 6,450,725 B1
(45) Date of Patent: Sep. 17, 2002

(54) HOLDING AND RELEASING MECHANISM WITH A SHAPE MEMORY ACTUATOR

(75) Inventors: Martin Roth, Taufkirchen; Andreas Schuster, Alsfeld; Heinz Voggenreiter; Harald Vorbrugg, both of München; Markus Reindl, Karlsfeld, all of (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/806,102

(22) PCT Filed: Sep. 14, 1999

(86) PCT No.: PCT/DE99/02901

§ 371 (c)(1),
(2), (4) Date: May 15, 2001

(87) PCT Pub. No.: WO00/17051

PCT Pub. Date: Mar. 30, 2000

(30) Foreign Application Priority Data

Sep. 24, 1998 (DE) .......................................... 198 43 965

(51) Int. Cl.[7] .............................. B25G 3/18; F16B 4/00; F03G 7/06

(52) U.S. Cl. .......................... 403/28; 403/322; 294/86.4

(58) Field of Search ............................. 403/28, 32, 177, 403/404, 322, 328; 294/1.1, 82.24, 82.26, 82.35, 86.4; 292/32, 33, 42, DIG. 66

(56) References Cited

U.S. PATENT DOCUMENTS

| 4,753,465 A | 6/1988 | Dalby .......................... 292/32 |
| 5,060,888 A | 10/1991 | Vezain et al. ................ 244/158 |
| 5,129,753 A | 7/1992 | Wesley et al. .............. 403/322 |
| 5,718,531 A | 2/1998 | Mutschler, Jr. et al. ....... 403/28 |
| 5,722,709 A | 3/1998 | Lortz et al. ................. 194/86.4 |

FOREIGN PATENT DOCUMENTS

DE 19649739 6/1998

*Primary Examiner*—Robert E. Pezzuto
(74) *Attorney, Agent, or Firm*—Ladas & Parry

(57) ABSTRACT

A retention and triggering mechanism with a shape memory actuator which ensures safe triggering and is of simple design and requires little energy. An end (7, 8) of a stressed wire is held by a free end of a wire made of shape memory material (9, 10) which contracts along its length when heated, thus withdrawing its free end from an opening (27, 28) formed in the end (7, 8) of the stressed wire thereby releasing the stressed wire.

13 Claims, 2 Drawing Sheets

HOLDING AND RELEASING MECHANISM WITH A SHAPE MEMORY ACTUATOR

FIELD OF THE INVENTION

The invention relates to a retention and triggering mechanism with a shape memory actuator.

BACKGROUND

In space technology it is known (DE-A1-196 49 739) to hold a wire which is subjected to tensile stress by its curved ends by means of a fusible wire which melts when a current is applied to it, thus releasing the wire. The wire which is subjected to tensile stress, shaped as a coil, keeps together two halves of a divided bolt mounting. When the wire is released, the two halves of the bolt mounting hinge apart under spring pressure, and the bolt can detach itself from the bolt mounting. The bolt is for example used to keep solar cell panels of a space vehicle pressed together during the start of the rocket, said solar cell panels being released by detaching the bolts when the location of the mission has been reached. The use of a fusible wire is associated with the disadvantage of unreliable and undefined triggering.

U.S. Pat. No. 5,129,753 discloses a retention and triggering mechanism with a shape memory actuator. A shape memory wire is used which at the time of triggering becomes shorter as a result of an increase in its temperature, thus lifting a securing sleeve from its rest position. During this action, the securing sleeve releases a chuck comprising several latch elements which fold out and release a gudgeon, thus releasing the connection.

U.S. Pat. No. 5,160,233 discloses a bolt mounting with a shape memory actuator for use in space technology; it is used for jettisoning empty fuel tanks which are held on the outside of a space vehicle by means of a bolt. The known bolt-mounting releases the bolt by temperature-control, by pushing apart cylinder segments in the bolt mounting which, with their interior thread, encompass from the outside the thread of the bolt. Pushing apart is effected in such a way that a cylindrical shape memory actuator lifts the cylinder segments together with the bolt into a position which in the bolt mounting permits lateral moving apart of the cylinder segments, and in that moving apart of the cylinder segments takes place by the actuator, which at its front is of truncated cone shape, entering an annular aperture formed by the cylinder segments. When the temperature is increased, the shape memory actuator extends in longitudinal direction, thus causing the above-described lifting and pushing apart of the cylinder segments. Temperature increase to cause triggering takes place via the Joule effect. Pushing apart the cylinder segments requires a relatively large and powerful actuator and when the parts slide one on top of the other in the bolt mounting, problems with regard to cold welding may occur. The cylinder segments, their fixation in the retention state, and the means for moving them apart in the triggering state, require a design which is relatively expensive from the point of view of construction.

SUMMARY OF THE INVENTION

It is thus the object of the invention to create a retention and triggering mechanism with a shape memory actuator, which ensures safe triggering, a simple design and low energy requirements.

BRIEF DESCRIPTION OF THE FIGURES OF THE DRAWINGS

According to the invention, this object is met by the characteristics of claim 1. Further embodiments of the invention are stated in the subordinate claims.

The retention and triggering mechanism according to the invention has the advantage that it comprises only a few parts, that due to its compact design it can easily be integrated in existing designs and thus simplifies known structures. The retention mechanism according to the invention provides a further advantage in that there are no components which need to be blasted away, as is the case e.g. with a pyrotechnical release, and that no parts are destroyed during release. When shape memory alloys are used which have been pre-treated in a special mechanical process step, the austenite start temperature is significantly above the values of commercially available TiNi alloys. If such alloys are used, the wire retainers according to the invention can be used to advantage even at higher ambient temperatures, such as may occur e.g. during space travel missions.

DETAILED DESCRIPTION

Figure 1:
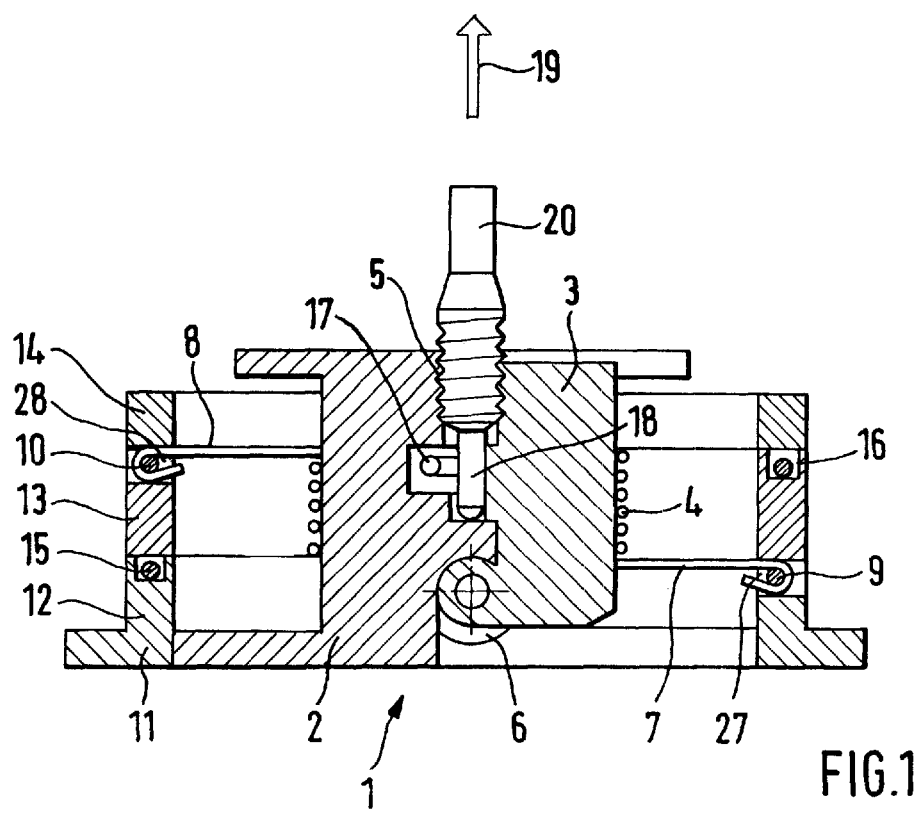
Figure 2:
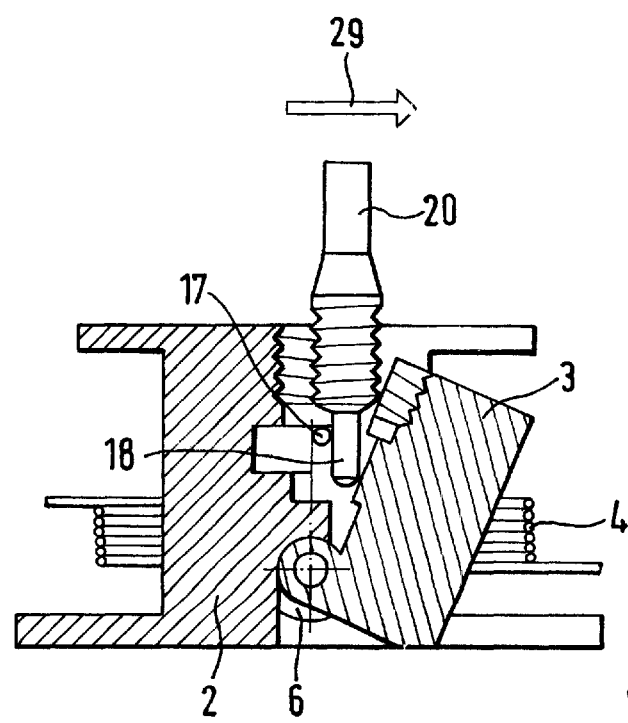
Figure 3:
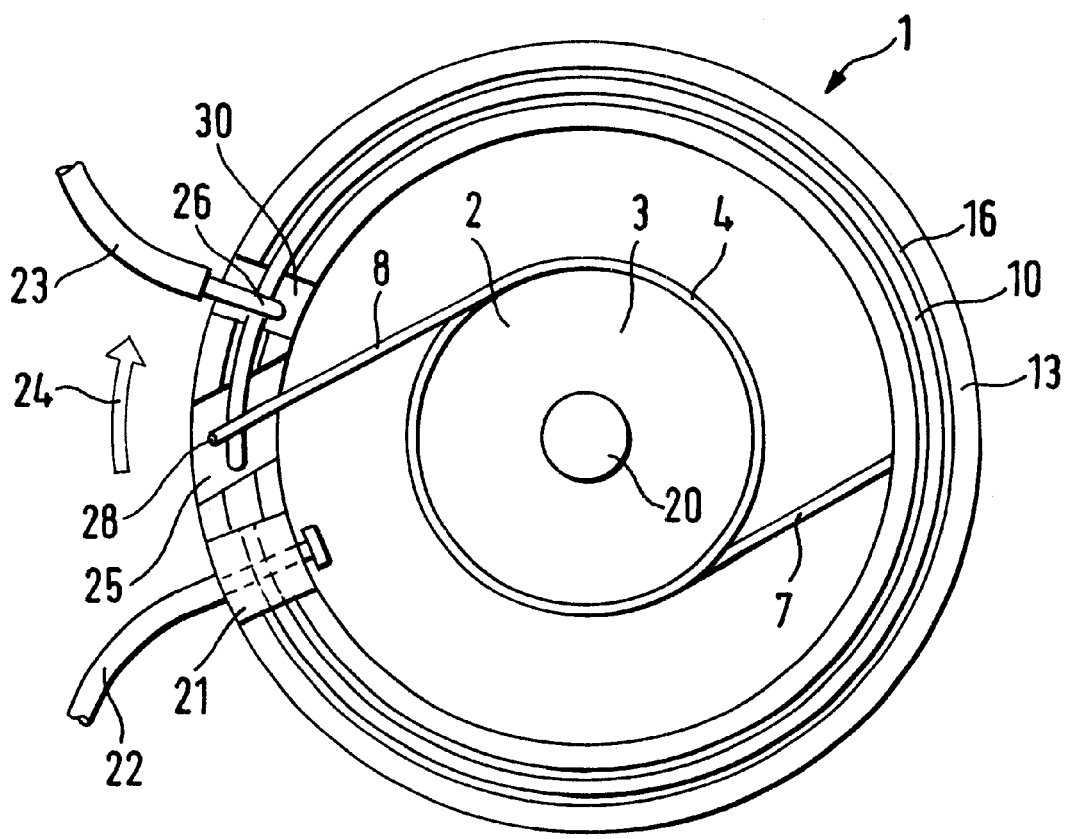

Below, embodiments of the invention are explained in more detail by means of drawings:

FIG. 1 is a sectional view from the front, of a bolt mounting with actuator retainer;

FIG. 2 shows the bolt mounting in the triggered state, with the actuator retainer not shown; and FIG. 3 shows a top view of the bolt mounting, with the top of the actuator retainer removed.

The embodiment shown in FIG. 1 of a retention and triggering mechanism 1 for a bolt 20 comprises two cylinder segments 2 and 3 serving as retention, a mechanical spring 6, a catch 17, a wire coil 4 with the two ends of a wire 7 and 8 which terminate in hook shaped apertures 27 and 28, and an actuator retainer 11 comprising a lower part 12, a middle part 13 and an upper part 14. In the actuator retainer 11, shape memory wires 9 and 10 are located in covered annular grooves 15 and 16. The annular shape memory wires 9 and 10 are interrupted, with one of their ends protruding through the apertures 27 and 28, in this way keeping together the wire coil 4 which is subjected to tensile stress by the spring 6. The bolt thread 5 and the remainder 18 of the bolt 20 to be held, protrudes into a threaded hole of the cylinder segments 2 and 3 held together by the wire coil 4.

FIG. 2 shows the triggered state of the previously described bolt mounting 1. By a controlled application of temperature, the two shape memory wires 9 and 10 (for the sake of clarity not shown in FIG. 2) contract along their longitudinal axis, thus withdrawing from the hook shapes 27 and 28. Consequently, the wire coil 4 opens and the cylinder segment 3 hinges away laterally, assisted by the pre-tensioned mechanical spring 6. The cylinder segment 3 which hinges away releases one longitudinal half of the bolt thread 5. The catch 17 attached to the cylinder segment 3 acts on the remainder 18 of the bolt such that it is taken along laterally as indicated by the directional arrow 29, thus also releasing the second longitudinal half of the bolt thread 5 from the bolt mounting 1.

The bolt 20 is for example used to hold together solar panels of a spacecraft during the start of the rocket, with the bolt being pre-tensioned by the compressed solar panels, along its longitudinal axis. During temperature-controlled triggering, after the triggering process described above, this pre-tension causes the bolt to be removed from the bolt mounting 1 according to the directional arrow 19 (see FIG. 1), thus releasing the solar panel for it to unfold.

FIG. 3 is a top view of the bolt mounting described above with the upper part 14 of the actuator retainer 11 (not shown in FIG. 3) removed. The ends of the wires 8 and 9 of the wire coil 4 lead tangentially from the wire coil 4 to the actuator retainer 11.

The visible middle section 13 incorporates the annular groove 16 in which the shape memory wire 10 is held. In the assembled state of the actuator retainer—with the upper part 14 in place—the annular groove 16 is covered by the upper part 14. The ring-shaped shape memory wire 10 is interrupted in one position; there one of its ends is held in the annular groove 16 by means of a wire mounting 21. Furthermore, the wire mounting 21 forms an electrical contact between the shape memory wire 10 and a current conductor 22. The other end of the shape memory wire 10 is not fixed in the annular groove 16 but instead, protrudes into a gap 25 which interrupts the annular groove 16 at a defined angle. The angle results from the tangential arrangement of the end of the wire 8.

In the gap 25, in the non-heated martensitic state, the end of the shape memory wire 10 protrudes through the hook shape 28 of the end of the wire 8 which is subjected to tensile stress. At the time of heating to the austenitic state, the end of the shape memory wire 10 withdraws from the hook shape 28, thus releasing the end of the wire 8.

Heating of the shape memory wire 10 takes place by the Joule effect. To achieve this, a second current connection 26 is provided on the freely movable end of the shape memory wire 10, with the end of the current conductor 23 stripped of its insulation, being mechanically connected to the shape memory wire 10, in a groove arranged transversely to the annular groove 30; said transverse groove being sufficiently wide to accommodate the contraction movement of the shape memory wire 10.

Various shape memory alloys can be used, e.g. normal TiNi wires without special mechanical pre-treatment with values for the austenite starting temperature ranging from 60 to 80 degrees C. The shape memory wire 10 of the embodiment shown is a TiNi wire, pre-treated in a special rolling process, so that the value for the austenite starting temperature of the wire is above 100 degrees C.

In the embodiment shown, the other end 7 of the wire, of the wire coil 4, is held according to the above details to the end of a wire 8 by means of the shape memory wire 9 which is held in the lower part 12 in the annular groove 15. However, it would also be possible to have one of the ends 7 or 8 of the wire held rigidly in the bolt mounting. The releasable retention of both ends of the wire provides an advantageous redundancy for triggering the bolt 20.

The actuator retainer 11 is made from polyetherether ketone (PEEK), a high-temperature resistant plastic material. This material is approved for space use, and its electrical parameter values regarding insulation are very good when compared to other plastic materials. The use of other temperature-resistant and electrically insulating materials is however also possible.

What is claimed is:

1. A retention and triggering mechanism for selectively and releasably holding a wire subjected to tensile stress, said retention and triggering mechanism comprising a shape memory wire which is capable of changing length when undergoing change in temperature, said shape memory wire being supported so that an end thereof is free to contract when the shape memory wire is heated, said wire which is subjected to tensile stress having an aperture in which said free end of the shape memory wire is engaged to normally retain said wire which is subjected to stress whereas when said shape memory wire is heated said free end is retracted from said aperture to release the tensile stressed wire.

2. The retention and triggering mechanism according to claim 1, wherein the shape memory wire is of annular shape.

3. The retention and triggering mechanism according to claim 2, wherein the shape memory wire is located in a covered annular groove, said annular groove being provided in the region of the free end of the shape memory wire with a gap for introducing the aperture of the tensile stressed wire.

4. The retention and triggering mechanism according to claim 1, wherein upon increased temperature the shape memory wire irreversibly contracts by a "one-way effect" of the material of the shape memory wire.

5. The retention and triggering mechanism according to claim 1, wherein the shape memory wire is made of a TiNi alloy.

6. The retention and triggering mechanism according to claim 5, wherein the shape memory wire is made of material which is pretreated mechanically so that the material can reach an austenitic state at a temperature above 100° C.

7. The retention and triggering mechanism according to claim 1, comprising an actuator retainer holding the shape memory wire, said actuator retainer being made from a temperature-resistant plastic material.

8. The retention and triggering mechanism according to claim 7, wherein said temperature resistant plastic material is polyetherether ketone (PEEK).

9. The retention and triggering mechanism according to claim 1, wherein heating of the shape memory wire takes place by Joule effect.

10. The retention and triggering mechanism according to claim 1, in which the retention and triggering mechanism is inserted in a bolt mounting having the tensile stressed wire wound as a coil holding together cylinder segments against the pressure of a mechanical spring; the cylinder segments forming a threaded hole threadably engaging a bolt which is subject to tensile stress, the retention and triggering mechanism holding the apertured end of the tensile stressed wire; and upon release of said free end of the shape memory wire from said apertured end of the tensile stressed wire, the cylinder segments move outwardly and release the bolt.

11. The retention and triggering mechanism according to claim 1, wherein said shape memory wire has one end secured and an opposite end terminating as said free end.

12. The retention and triggering mechanism according to claim 11, wherein said shape memory wire is slidably supported in an annular groove which has an interruption to form a gap in which said aperture of the tensile stressed wire is received, said free end of the temperature sensitive wire projecting into said aperture in said gap.

13. The retention and triggering mechanism according to claim 12, comprising an electrical lead wire connected to said shape memory wire proximate said free end thereof to electrically heat said shape memory wire and freely move with said free end of the shape memory wire during contraction thereof.

* * * * *